United States Patent [19]

Kudo et al.

[11] 4,204,005

[45] May 20, 1980

[54] PROCESS FOR PRODUCING FIBROUS FOOD MATERIALS

[75] Inventors: Shiro Kudo, Ito; Mitsuyoshi Hayashi, Toyooka, both of Japan

[73] Assignee: Asahimatsu Koridofu Kabushiki Kaisha, Nagano, Japan

[21] Appl. No.: 861,564

[22] Filed: Dec. 16, 1977

[30] Foreign Application Priority Data

Dec. 27, 1976 [JP] Japan ............................. 51-158359
Apr. 18, 1977 [JP] Japan ............................. 52-44381

[51] Int. Cl.² ........................ A23P 1/00; B02C 7/02
[52] U.S. Cl. ..................................... 426/518; 241/6; 241/27; 241/244; 241/261.2
[58] Field of Search ............... 426/455, 456, 459, 460, 426/462, 464, 465, 473, 518; 241/6, 8, 12, 27, 244–248, 257 R, 261.2, 261.3

[56] References Cited

U.S. PATENT DOCUMENTS

| 1,522,689 | 1/1925 | Maclachlan | 426/464 X |
| 1,598,328 | 8/1926 | Truax | 426/518 X |
| 2,745,748 | 5/1956 | McCashen | 426/518 X |
| 3,320,905 | 5/1967 | Urschel | 426/464 X |
| 3,788,861 | 1/1974 | Durst | 426/464 X |
| 3,851,085 | 11/1974 | Rodgers et al. | 426/464 X |
| 3,891,613 | 6/1975 | Rao et al. | 426/518 X |
| 3,958,036 | 5/1976 | Latimer | 426/464 X |
| 3,983,261 | 9/1976 | Mendoza | 426/518 X |

Primary Examiner—Arthur L. Corbin
Attorney, Agent, or Firm—Toren, McGeady and Stanger

[57] ABSTRACT

Raw food materials, having a 10–65% water content, are ground between two opposing disc grinding members. The opposing discs are concave to form a central hollow portion therebetween having a nearly trapezoidal cross section.

2 Claims, 1 Drawing Figure

PROCESS FOR PRODUCING FIBROUS FOOD MATERIALS

BACKGROUND OF THE INVENTION AND THE FIELD OF THE INVENTION

The present invention relates to a process for producing fibrous or granular foods, feeds or their materials from a single or combination of two or more natural food materials. The raw materials usable in the present invention include almost all sorts of natural food materials. They include cereals, such as beans, wheat, barley, corn, rice; processed cereals, such as wheat flour, separated protein, degreased soybean meal, and starch; birds and quadruped animals including their meat, skins, bones, milk, blood, eggs and their shells; fish and shells including their skins, bones, organs, shells and eggs; insects and their chrysalis; microorganisms and their protein; skin of oranges; sea weeds; vegetables; seeds and nuts; mushrooms; tea and tobacco leaves; agar-agar and C.M.C.; and additives to food or feed, such as M.S.G., NaCl, and chemical seasonings.

The food or feed (hereinafter called simply "food") and materials produced therefrom by the process of this invention are fibrous or granular in appearance and they may easily be given appropriate elasticity and meat-like texture only by selecting the suitable raw materials. Artificial meat and the like can easily be obtained from a dried food material to restore the original form, and meat-like texture and elasticity by treating the dried food material with cold or hot water. Therefore, these food materials can be used as a substitute for meat to be added to a processed product of meat. The dried materials treated with cold or hot water can be cooked alone or in mixture with ground meat in the same way as ordinary meat.

As will be mentioned later, the process of this invention is quite different in principle from those which utilize the thread spinning technique in producing fibrous artificial meat. The present process is capable of using almost all kinds of raw food as the source material for fibrous or granular food materials (naturally this technique can be applied for making fertilizers, medicines, and various industrial materials); further these raw materials are used without any particular pretreatments, for example, soybeans can be used as is, and a big fish need only to be cut into pieces of an appropriate size before the treatment. Those substances which could not hardly be converted into food, such as seed-skin, bone, skin and fin, are successfully converted into food material. Moreover, the raw materials used cannot be ascertained from the appearance of the product. Naturally physical properties of the products are different depending on the nature of raw material, but they should be fibrous or granular in appearance. The fibrous or granular shape is maintained even when they are boiled in hot water or soaked in cold water.

For easy understanding of the present invention, it will be described with reference to fibrous protein which is nowadays actually produced as fibrous food material.

In recent time, many investigations of new vegetable protein foods have been carried out and quite a few protein foods have come into existence. The products are classified into two groups: one is fibrous protein and the other is tissue-like protein. The former is more like natural meat when touched, but it requires more complicated processing, which results in lower nutritional value and lower yield, and hence a higher cost. The latter product, however, has less of the tactile characteristics of natural meat.

The most prevalent method to make fibers from non-fibrous protein is based on spinning said protein in an acid solution using a specified spinning device, but the method is tedious, and the fibers produced are too homogeneous with respect to shape and property to simulate the feel of natural meat. In another method, a high polymer polysaccharide is added to protein and the mixture is treated to give fiber products. However, this method does not afford high quality products.

The present process is a peculiar one, for converting non-fibrous protein into fibers in very simple operations in that it does not require the kind of spinning device which conventional processes do, the manufacturing principle of this process is entirely different from those of conventional ones, and any additive, for example, high molecular compounds and polysaccharides, is not added. The process is much simpler than the conventional methods and the product obtained possesses excellent physical properties which are equivalent or superior to those of other processes.

The method of manufacturing by the present invention will be explained with reference to an example.

When soybean is used as starting material, the whole grains of the soybean are soaked in water to give them an adequate amount of water (the most favorable amount depends on the material and the desired product, in this case 40–55% is desired), and are passed through a very narrow gap between two grindstones which rotate at a high speed (the size of the gap and the speed of rotation depend on both material and desired product, but 0.2 mm or less is favorable when fibrous protein is to be made from soybeans). Then the whole grains of soybean are converted into fibers, and since they contain fat substances, the product serves as a fibrous protein food material.

The conventional method of preparing fibrous protein using the thread-spinning technique requires, in its pretreatment stage, the extraction of pure protein for purification and the complete removal of fat and oil for the purpose of giving the product a meat-like texture. Such a treatment is not necessary at all in the present invention. In addition to whole soybean and degreased soybean, soybean containing fat and oil and degreased soybean to which some oil has been added can also be processed by the present invention into fibers.

In this invention, physical properties of products could be varied extensively by varying the conditions of pretreating the raw material and elements of the apparatus (for example, material, cutting and speed of rotation of two grindstones and the gap between them).

On the other hand, the preparation process of tissue protein by use of an extruder brings about relatively small loss of the raw material and particularly does not require a complicated process, but the treatment which is carried out at a high temperature and pressure necessarily brings about superdenaturation of protein. This results in loss in nutrition, in a non-meatlike texture, and taste. To the contrary, the process of this invention does not involve any special chemical treatment nor any high temperature-high pressure treatment. The whole process goes strikingly fast; the conversion from the raw material to fibrous material requires less than a second. Of course, in the process of our invention, the material being processed momentarily passes a zone of high temperature and pressure during the full course which starts from crushing the raw material and finishes when it has been fiberized or granularized. However, it is too short a time (a few tenths of a second) to cause nutritious defect.

According to the present invention, whole grains of soybean are divided in very tiny pieces in the same manner as they are ground on a mortar. In this case, the protein is particulate and therefore is not oriented. However, when the particles which contain an adequate amount of water travel through a narrow gap (an aperture less than 1 mm, preferably less than 0.5 mm) between two grindstones rotating at a high speed (8–8,000 m/min., preferably 80–600 m/min. by the peripheral speed), they rotate in the same direction, are pressed together under high pressure and are twisted into threads or fibers. Simultaneously, they are heated by the heat evolved as heat of friction, and as a result they are texturized. The water content is the most important factor to make up fibers. If the water is at a very low level, the crushed powder will not be formed into a fiber but will be produced in the form of a fine powder. On the other hand, when the particles contain a high level of water, the crushed powders will disperse themselves in the water and come out as a paste or liquid without adhering to each other. The moisture content necessary to make a fibrous product depends on the nature of raw materials, but generally speaking a water content of 10–65%, and preferably 20–65%, by weight is desired.

In particular, when the raw material contains a high content of protein, evolution of heat of friction is very important to denature the material. The temperature at which denaturation takes place is between 60° and 150° C. for whole grain of soybean. The heat may be applied from outside if necessary, but usually the heat of friction occurs by the frictional rotation of grindstones. However, when the rotation occurs for a short period of time, the material may better be heated intentionally.

Soybeans, being taken as an example, are crushed into tiny pieces together with their skins and cell membranes containing fibrous matters and fat and oil. These tiny fibers and fat are mixed with the protein. In conventional processes these matters should be removed, while in the present invention they need not be removed and moreover the presence of these fibrous matters and fat and oil results in bringing about better texture and taste as well. Fibrous protein of the same level of properties could naturally be produced from high protein materials such as separated protein powder and powdery egg whites (which may contain fat and oil).

Raw materials to be used in this invention include not only cereals and beans which may be used as they are yielded, such as whole soybean, barley, wheat, corn, rice and peanut, but also secondary processed materials such as degreased soybean, wheat gluten, separated protein, soybean curd (or tofu in Japanese). Other materials for use in this invention include almost all food materials covering meat of animals, birds and fishes, and vegetables, sea weeds, and many others. These materials may be used either alone or in admixture of two or more.

DETAILED DESCRIPTION OF THE INVENTION

A detailed explanation will be given below to the operation of the process with particular reference to soybean, an important source of vegetable protein and with reference to the attached drawing.

Figure 1:
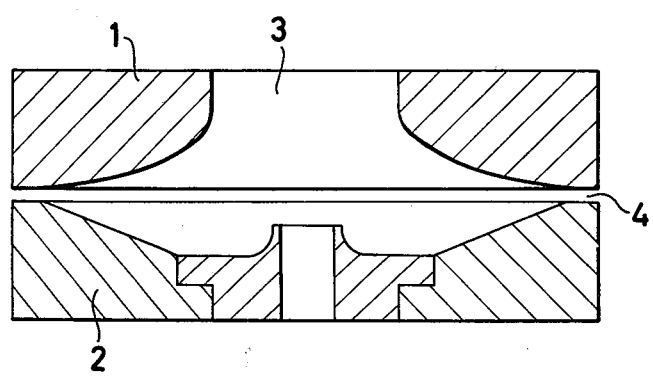
FIG. 1 is a schematic view of a colloid mill used in the present invention.

In the pretreatment, grains of soybean are soaked or boiled in water to adjust the water content.

As has been described before, the material travels through the high temperature zone (at about 100° C.) momentarily while being crushed by the frictional movement, where enzymes are deactivated and the soybean odor is removed in this stage. Therefore, additional pre- and post-treatments are not required any more. When whole grains of soybean are the starting material, they are adjusted to contain 40–55% of water to obtain the best fibers. The skins are peeled if necessary, but the achieved characteristics are not significantly influenced by peeling. The fibrous products may be further treated to attain different characteristics. For example, fibrous protein obtained can be further heated by steam, or in hot water, or promoted to be denatured in an acid solution, which treatment serves to change the texture. In some cases dyeing is also possible.

The operation to make fibers is the most important part of the present invention, of which the principle is entirely different from those of conventional processes of producing fibrous and tissue proteins, as already mentioned.

The colloid mill to be used in the manufacturing of this invention, as seen in the attached drawing (FIG. 1), has usually two grinding disks which are made from grindstone, stainless steel material, or artificial grindstone. The two disks (1), (2) are placed facing each other, of which the upper one (1) is fixed and the lower one (2) rotates at a high speed, or vice versa, or otherwise the two disks rotate in directions opposite to each other. The grinding occurs only in the peripheral parts (4) of the disks, and the central portions (3) are concave to form a hollow portion with an approximately trapezoidal cross section. The desirable area of grinding is about 1 cm wide, but this invention is not restricted to the size. The disks are so set that the distance between them could be varied at will. The distance should be decided in the range up to 1 mm depending on the end product, but a distance smaller than 0.5 mm is favorable. The speed of rotation also depends on the size of the disks and is best changed continuously.

The grinding disks are made ideally from a material resistant to a high pressure and temperature and, at the same time, their surface should be rough enough to prevent raw materials from slipping.

The mentioned principle of manufacturing is adopted, though not exactly but approximately, in an attrition mill, disk crusher (Simonds disk crusher) and Hildebrande mill.

The appearance of the fibrous soybean produced by the present invention, apart from that of conventional fibrous protein manufactured by use of spinning technique, is not so uniform; long ones are 100–200 mm long and short ones are less than 10 mm, and the thickness of the fibers varies, some are less than 0.1 mm thick and some about 0.5 mm thick. The non-uniformity of the product fibers gives the touch of natural meat. The texture could be varied in a pre- or post-treatment, as well as giving coloration and odor, at will. The protein product thus fiberized, whose physical properties depend on its water content, is dried if necessary.

When the water content of a product is relatively low, the product can be preserved in high quality without further drying. Also, the water content can be adjusted during the grinding. This is an additional feature of this invention.

The above explanation of the process has been done using whole soybean as an example, but the present invention is not restricted to it. Thus, the same effect can be expected if grains of whole soybean are crushed beforehand and ground with a colloid mill. The process also can be applied to degreased soybean, to cereals and beans in general such as wheat, barley, rice, flour, corn, corn gluten meal and wheat gluten. Materials to be used are extended to include animals and birds (meat, bones, skins, blood, eggs, egg shell), fish and shells (meat, skins, bones, internal organs, shells and eggs), insects and their chrysalis, protein of microorganisms, skins of oranges, sea weeds, vegetable foods such as some vegetables, seeds, nuts, and mushrooms, chemical seasonings such as M.S.G., NaCl, etc. The details of application to these materials have been described in the foregoing sections. Naurally, these materials can be used either alone or in admixture. In any case it is important in the pre-treatment is to adjust the water content of the material to be fiberized.

Also the present invention is applicable to chemical seasonings of a low molecular weight such as amino acid, M.S.G., NaCl and others, which are not fiberized alone, but rather, can be fiberized or granularized by combining them with other suitable materials.

The raw food materials of both animal and vegetable origin, which are to be processed by the present invention, are first crushed into pieces of a suitable size which are adequate for treatment with a colloid mill. If necessary, these are mixed with other materials, and the water content of the mixture is adjusted to 10-65% by weight, preferably 20-65%, which is then ground in a colloid mill. Fibrous or granular raw food materials can be obtained by the above mentioned treatment, and may have a peculiar texture and therefore a wide range of applications as raw food material.

In the present invention, the water content should be adjusted immediately before the colloid mill treatment to 10-65% by weight, preferably to 20-65%. This value has been deduced from many experimental runs (see Examples). Of course the best value of the water content depends on the particular material. However, if it is adjusted to below 10%, the ground matter does not cluster to form fibers. If the content exceeds 65%, the ground matter will be dispersed in the water, and hardly form fibers.

The present process features, as has been described above, the possible use of almost all kinds of food materials, depending on the purpose and need, to prepare many different kinds of fibrous food materials.

Now the present invention will be explained using particular examples as follows.

DESCRIPTION OF PREFERRED EMBODIMENTS

EXAMPLE 1

Whole grains of soybean in the amount of 5 kg were soaked in tap water for 3 hours until the water content of the soybean reached 46% (by weight), and then they were peeled. Subsequently they were continuously introduced into a colloid mill (a supermicro refiner MK-Z-10, manufactured by Masuko Industry and distributed by Sankyo Company), of which the rotation was adjusted to 1,500 rpm and the distance between grinding disks to 0.06 mm. In about 2 minutes the above soybean was completely processed into fibers. The above fibrous soybean product was heated for 5 minutes by superheated steam, or boiled for 5-10 minutes in hot water, or soaked in cold or hot water of approximate pH 4.5 for 10 minutes and then dehydrated by centrifugation to obtain the fibrous food material.

This food material, even when kept soaked one whole day in water and for an hour in hot water, kept its original form without decay. The food material can be stored in ice-cold or refrigerated condition. Otherwise it can be dried in the usual process to make it storable.

EXAMPLE 2

Five kilograms of whole grains of soybean were soaked for two and a half hours in tap water, until the water content reached 39%. Without being peeled, the substance was transferred to a colloid mill (the distance between two grindstones was adjusted to 0.003 mm), the same one as was used in Example 1. The post-treatment was carried out introducing heat treatment since the pre-treatment contained no heating as it was in Example 1. Thus, heating was carried out for 5 minutes with steam, and dehydrated by centrifugation, to obtain a fibrous food material which was almost the same as that in Example 1.

EXAMPLE 3

Five kilograms of whole grains of soybean were soaked in water for 2 hours and then boiled for 3 minutes in sufficient water to achieve a water content of 42%. The substance was then introduced to a colloid mill as in Example 1, to obtain almost the same fibrous food material as appeared in Example 1.

EXAMPLE 4

Five kilograms of whole grains of soybean were soaked in water for 2 hours and then boiled for 3 minutes in sufficient water to achieve a water content of 50%. After being peeled, the substance was passed to a colloid mill as in Example 1 to obtain almost the same fibrous food material as appeared in Example 1.

EXAMPLE 5

Five kilograms of whole grains of soybean were soaked in tap water for 3 hours and then heated for 40 seconds with pressed steam (4 kg/cm$^2$) until the water content reached 42%. Subsequently, the material was introduced to a colloid mill as in Example 1 to obtain almost the same fibrous food material as in Example 1.

EXAMPLE 6

Five kilograms of whole grains of soybean were heated with an electronic range in a manner such that burning did not occur and soaked in tap water for 4 hours until the water content reached 38%. Then the substance was introduced to a colloid mill to obtain the same fibrous food material as that appeared in Example 1.

EXAMPLE 7

To 5 kg of degreased soybean powder, 3.5 l of water was added and the mixture was thoroughly kneaded. The water content was adjusted to 47%, and introduced to a colloid mill as in Example 1. As the post-treatment, heating with steam was carried out for 5 minutes, to obtain a fibrous food material.

EXAMPLE 8

To 5 kg of degreased soybean powder, 3.8 l of water were added, thoroughly kneaded and heated for 3–5 minutes in an electronic range, until the water content reached 48%, and then introduced to a colloid mill, to obtain fibrous food material.

EXAMPLE 9

In a usual process, 5 l of soybean milk was prepared from 1 kg of whole grains of soybean and curd was produced from it with calcium chloride added. The curd containing 70% of water amounted to 1.3 kg when dehydrated with a centrifuge. The total water content was adjusted to 50% by simply adding separated protein, followed by the treatment with a colloid mill in the same manner as in Example 1, to obtain fibrous food material. (Otherwise, a drying or dehydration treatment may be applied to the curd in place of adding dried powder for the purpose of adjusting the water content to about 50%. Subsequent treatment should be undergone as in Example 1.)

EXAMPLE 10

A mixture of 2 kg of wheat gluten with 1.5 l of water was thoroughly kneaded to make the water content approximately 48%. This was treated with a colloid mill as in Example 1, to obtain fibrous food material.

EXAMPLE 11

A mixture consisting of 2 kg of corn for animal food (in coarse pieces) and 1.2 kg of water was thoroughly kneaded to adjust the water content to 37%. This was treated with a colloid mill as in Example 1 to prepare a fibrous food material. Since corn contains a relatively large amount of starch, the fibers therefrom exhibit localized swelling, such as puffdried cereals. This property is particularly correlated to the water content of the mixture.

EXAMPLE 12

A mixture of 2 kg of corn gluten with 1.5 l of water was thoroughly kneaded to adjust the water content to approximately 48%. This mixture was then treated with a colloid mill as in Example 1, to obtain fibrous food material.

EXAMPLE 13

Water content of pressed barley for animal food was adjusted to 48% by adding 1.5 l of water to 2 kg of the barley. This was then treated with a colloid mill as in Example 1, to obtain fibrous food material. (Skins of barley are not edible in their original state, while the present invention could convert them into a completely edible state.)

EXAMPLE 14

A mixture of 1 kg of mutton pieces, 9 kg of whole grains of soybean, and 3.8 kg of water was stirred to attain uniform distribution and the water content was made 40% by weight. Then this was continuously introduced to a colloid mill (a supermicro refiner MK-2-10, manufactured by Masuko Industry and distributed by Sankyo Company) of which the rotation was adjusted to 1,500 rpm and the distance between the grinding surfaces to 60 micron. The whole amount of the mixture was released at a rate so as to discharge from the apparatus in about 3 minutes in the form of fibers. The fibrous mixture was heated for 5 minutes with overheated steam, or boiled for 5–10 minutes with water, or soaked for 10 minutes in a buffer solution of approximate pH 4.5 or in a solution containing the buffer. Then the matter was dehydrated by centrifugation to obtain fibrous food material. The food material thus prepared can keep its original form even on soaking in water for a whole day and in hot water for an hour. On refrigerating, freezing, and drying, the material did not lose its excellent physical properties, and did not possess an unfavorable odor (of soybean or of mutton) or taste.

EXAMPLE 15

One kilogram of thigh mutton was boiled for 3 minutes in sufficient amount of water, dehydrated by centrifuge, and the water content was adjusted to 50% by weight. On the other hand, 9 kg of whole grains of soybean were baked in an electronic oven to the extent not to cause burning, soaked for 1.5 hours in tap water, to make the water content 29% by weight. To a mixture of the above materials were mixed 200 g of kitchen salt, 225 g of sugar, 1,350 g of soybean sauce, smoking liquid, and a little amount of chemical seasoning. The resulting mixture was made homogeneous by kneading with a kneader. With the water content adjusted to 39% by weight the mixture was frozen and treated with a colloid mill in the same manner as in Example 1. This material was edible when dried, or used as is, as a cooked meat product.

EXAMPLE 16

A mixture consisting of 7 kg of crushed bones of cocks, pigs, and oxen, 2 kg of wheat, degreased soybean, whole grains of soybean and 1 kg of dried okara (residue of soybeans from which soluble matter has been extracted) was stirred to attain uniform distribution and the water content was adjusted to 45% by weight. The resulting material was treated with a colloid mill as in Example 1. Since heating is not contained in the pre-treatment, heating was introduced in the post-treatment as it was in Example 1. Thus, heating was conducted for 5 minutes with steam, followed by dehydration by centrifugation, to obtain fibrous food material.

EXAMPLE 17

Skin and internal organs of cocks, and internal organs of pigs and oxen crushed or cut in pieces amounting to 5 kg were mixed with 5 kg of degreased soybean and adequate amount of water. The mixture was heated with an electronic range for 15 minutes to reduce the water content to 50% by weight. This was treated with a colloid mill to obtain fibrous food material.

EXAMPLE 18

Cod (sukeso cod in Japanese) including bones and skin as well as meat in gross pieces amounting to 6 kg was mixed homogeneously with 4 kg of degreased soybean, and the total water content was made 55% by weight. This was treated with a colloid mill as in Example 1. Post-treatment heating was carried out as in Example 1, since heating was not effected in the pre-treatment. Thus, heating was conducted for 5 minutes with steam. The resulting product was dehydrated by centrifugation to obtain fibrous food material.

EXAMPLE 19

A single substance or a mixture of them selected from degreased soybean and wheat, amounting to 1 kg, was mixed with 410 g of blood of pigs and oxen. The mixture was stirred to attain uniform distribution. This was heated with an electronic range for 15 minutes to adjust the water content to 35% by weight and treated with a colloid mill as in Example 1 to obtain fibrous food material. The final product was superior to conventional artificial meat in taste, color and smell.

EXAMPLE 20

Scraps of dried skipjack, small boiled and dried sardines, tangles, mushrooms and bones of cocks and animals, alone or in an admixture were treated to adjust the water content to 40% by weight and treated with a colloid mill as in Example 1 to obtain fibrous food material. The product was dried and packaged in a permeable bag, something like a tea-bag, and was especially useful to produce tasteful soap in Japanese dishes. The soap thus produced was transparent in contrast to the turbid soaps obtained from commercially available bags. The residue in the bag which remained in its original form could be used as food for fish, dogs and cats.

EXAMPLE 21

The water content of dried cod and cuttlefish, separately or in admixture, was adjusted to 35% by weight. The material was applied to a colloid mill as in Example 1, to prepare fibrous food material. The material with a little kitchen salt applied was most suited as relish with sake.

EXAMPLE 22

Chrysalis of silkworm, maggots and earthworms, 7 kg in total, were mixed with 2 kg of wheat, 1 kg of dried unextracted residue of soybeans (okara in Japanese), rice bran, wheat bran, and less amount of beet. The mixture was stirred to attain uniform distribution of ingredients, adjusted to a water content of 45% by weight and introduced to a colloid mill, as in Example 1, to obtain fibrous food material. The final product did not decay in water and therefore was suited as food for fish.

EXAMPLE 23

One kilogram of dried whole hen eggs, or dried egg white was mixed with 290 g of water. The water content was adjusted to 30% by weight. This material was introduced to a colloid mill as in Example 1, to obtain fibrous food material.

EXAMPLE 24

Shells of eggs, shellfish and lobsters, 3 kg in total were crushed, and to the pieces were added 5 kg of flour and 2 kg of unextracted residue of soybeans (okara). The water content of the mixture was adjusted to 25% by weight, and the mixture was introduced to a colloid mill to obtain fibrous material. The final product was suited as food for cocks.

EXAMPLE 25

To completely degreased milk powder or completely degreased condensed milk with added sugar, water was added so as to attain a water content of 40% by weight. This was introduced to a colloid mill as in Example 1 to obtain fibrous food material. When the final product was boiled in water, soluble ingredients were dissolved but did not decay since the insoluble components, such as protein, remained unchanged. This product proved most suited as an additive to soap.

EXAMPLE 26

A mixture consisting of 5 kg of glutinous rice, 5 kg of mashed potato, and 2.7 kg of water was treated to adjust the water content to 30% by weight, and the mixture was introduced to a colloid mill as in Example 1, to obtain fibrous food material. This material, when fried, swelled and is suitable as a nice snack having good appearance and texture.

EXAMPLE 27

Eight kilograms of buckwheat flour, 2 kg of wheat, and 3 kg of water were mixed and the water content was adjusted to 35% by weight. The mixture was introduced to a colloid mill as in Example 1 to obtain a fibrous food material having a tough texture. The final product was suited for use as instant noodles.

EXAMPLE 28

One kilogram of peels of citron or mandarin orange, 0.5 kg of powders of Japanese pepper, ginger or horseradish, 1 kg of tangle and 7.5 kg of flour was treated to adjust the water content to 35% by weight, and introduced to a colloid mill as in Example 1 to obtain a fibrous food material. The final material was very fragrant and was best suited as an additive to tea-soaked rice.

EXAMPLE 29

To vegetable products, such as dried gourd shavings and Chinese bamboo sprouts, water was added to give a water content of 40% by weight. This was introduced to a colloid mill as in Example 1 to obtain fibrous food material. The final product was suited as additives for Chinese style noodles.

EXAMPLE 30

Water was added to beans, such as red beans and peas, to attain a water content of 33% by weight. This was treated with a colloid mill as in Example 1 to obtain fibrous food material.

EXAMPLE 31

Water was added to nuts, such as peanuts and chestnuts to attain a water content of 55% by weight. The mixture was treated with a colloid mill as in Example 1 to obtain fibrous food material.

EXAMPLE 32

Protein of microorganisms, such as yeast powder was mixed with water so as to attain a water content of 45% by weight. The mixture was treated with a colloid mill as in Example 1 to obtain fibrous food material.

EXAMPLE 33

Water was added to scraps of tea leaves to attain a water content of 40% by weight. The mixture was treated with a colloid mill as in Example 1 to obtain fibrous food material. This process was useful in reducing the time for tea-processing.

EXAMPLE 34

To 1 kg of separated protein from soybean was added 44 g of water, and the water content was adjusted to 10% by weight. This mixture was treated with a colloid mill as in Example 1, of which the speed of rotation was controlled so that the peripheral speed of the rotating disk was 2 m/min. and the distance between the two disks was 1 mm. Since the pre-treatment did not contain heating as in Example 1, a heating process was added to the post-treatment. Thus, heating was carried out for 5 minutes by steam. The product was dehydrated by centrifugation to obtain granular food material.

EXAMPLE 35

To 1 kg of potato starch was added 250 g of water and mixed to produce a water content of 20% by weight. The mixture was introduced, as in Example 1, to a colloid mill of which the rotation was controlled so that the peripheral speed of the rotating disk was 80 m/min. and the distance between the two disks was 0.5 mm. Fibrous food material was produced by this process.

EXAMPLE 36

Three-hundred grams of kitchen salt was uniformly distributed in 700 g of potato starch, to which 333 g of water added, and the water content of the whole mixture was controlled to be 25% by weight. This was introduced, as in Example 1, to a colloid mill of which the speed of rotation was controlled so that the peripheral speed of the rotating disk was 1,600 m/min. and the distance between the two disks was 0.3 mm. Granular food material was produced by this process.

EXAMPLE 37

To 1 kg of separated protein from soybean was added 1,700 g of water. The whole mixture was thoroughly mixed and the water content was adjusted to 65% by weight. This was then introduced, as in Example 1, to a colloid mill of which the speed of rotation was controlled so that the peripheral speed of the rotating disk was 8,000 m/min. and the distance between the two disks was 0.005 mm. Fibrous food material could be obtained by this process.

The above examples illustrate the most preferred embodiments of the present invention, and the present invention should not be limited thereto. Particularly those materials which could hardly be used as food by themselves can be converted into fibrous or granular forms by the present invention. These materials not only make the processing and cooking that follows easier, but also provide new foods that have different texture, taste, and appearance from those of previous foods by selecting the ingredient materials, as has been described in detail.

Another advantage of this invention is that the cost for production could be reduced to a large extent since it involves very simple operations.

Further, the principle of this invention is not restricted to foods, but can be extended for use as medicines, fertilizers and other industrial materials.

What is claimed is:

1. A process for producing fibrous or granular foods and feeds from cereal, vegetable, animal and fish materials comprising adjusting the water content of the materials to between 10–65% by weight and grinding the raw food materials between two opposing disc grinding members separated by a gap not larger than 1 mm, wherein one of the grinding members rotates at a peripheral speed from 8 to 8000 m/min, and wherein the opposing discs are concave to form a central hollow portion therebetween having an approximately trapezoidal cross section.

2. The process of claim 1 wherein the water content is adjusted during the grinding.

* * * * *